Nov. 12, 1968     E. SCHNEIDEREIT     3,410,713
PROCESS AND APPARATUS FOR APPLICATION OF ADHESIVE
Filed July 31, 1964                          4 Sheets-Sheet 1
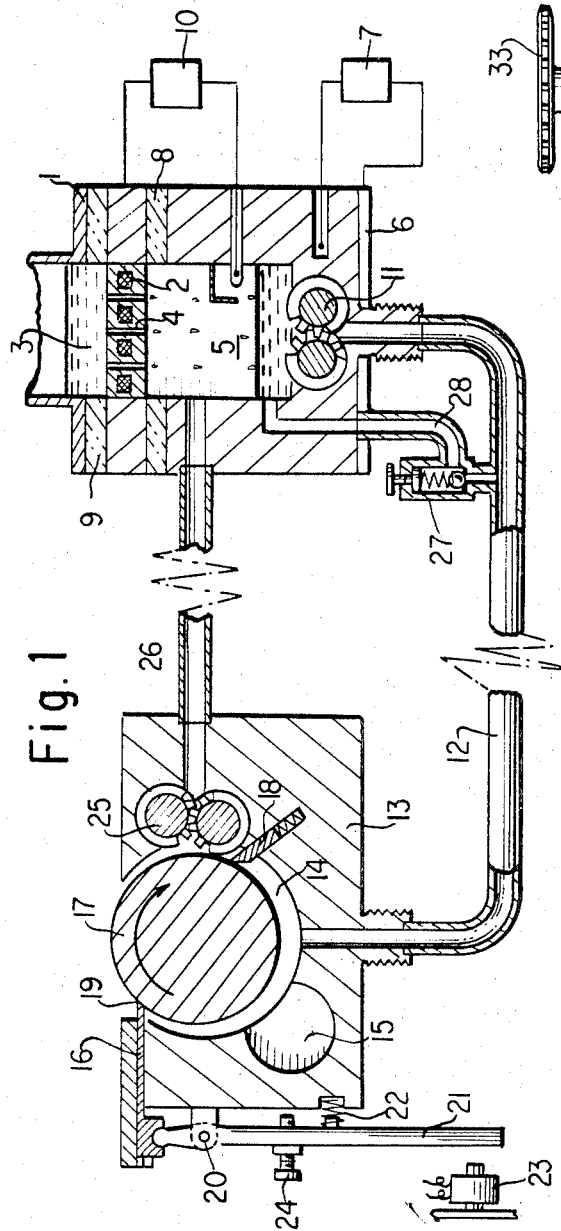
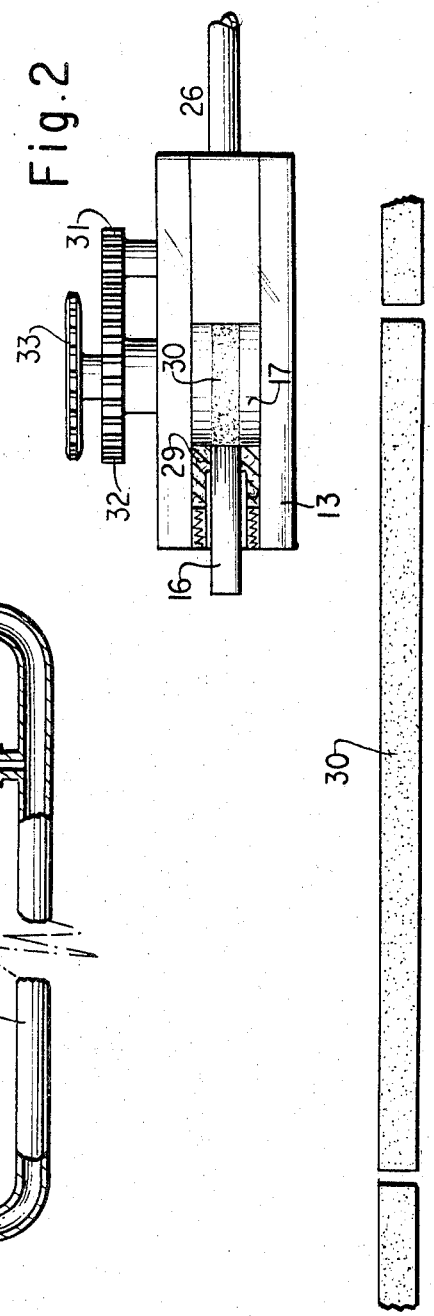
INVENTOR
EWALD SCHNEIDEREIT
BY *Hammond & Littell*
ATTORNEYS Nov. 12, 1968  E. SCHNEIDEREIT  3,410,713
PROCESS AND APPARATUS FOR APPLICATION OF ADHESIVE
Filed July 31, 1964  4 Sheets-Sheet 3
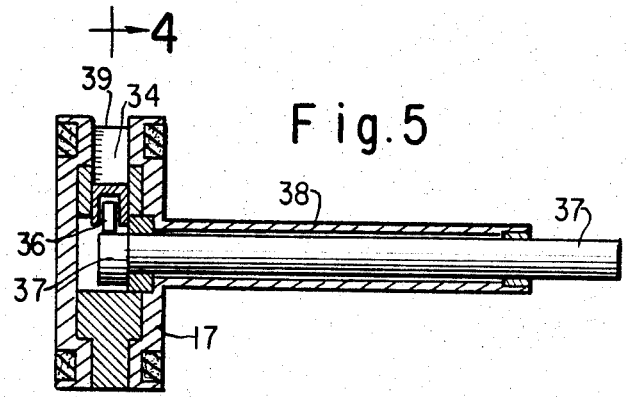
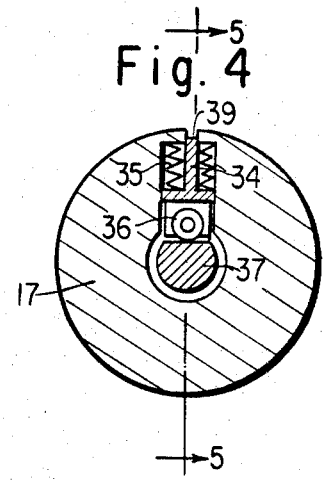
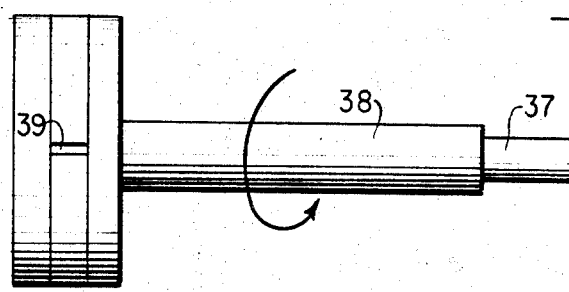
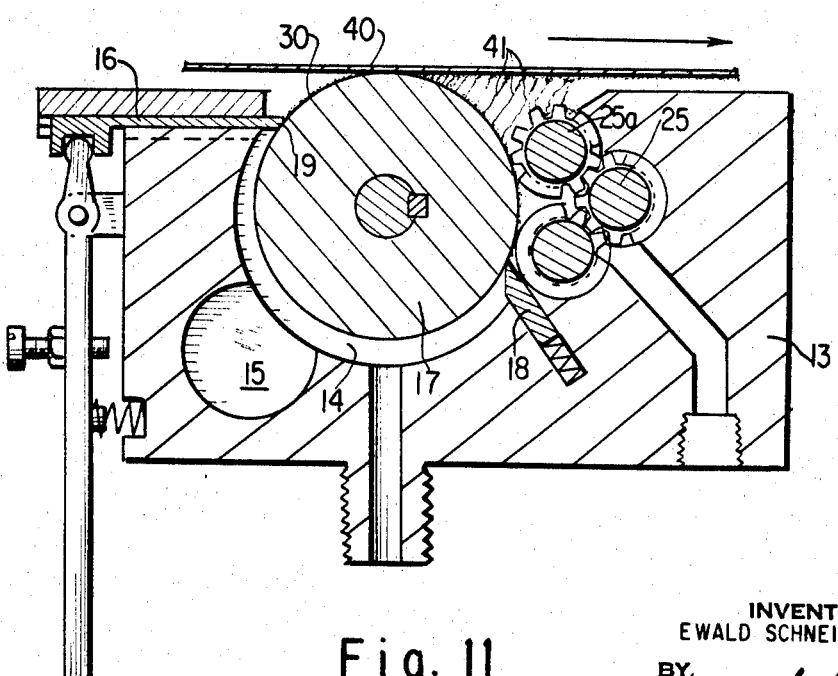
INVENTOR
EWALD SCHNEIDEREIT
BY Hammon & Littell
ATTORNEYS Nov. 12, 1968 E. SCHNEIDEREIT 3,410,713
PROCESS AND APPARATUS FOR APPLICATION OF ADHESIVE
Filed July 31, 1964 4 Sheets-Sheet 4
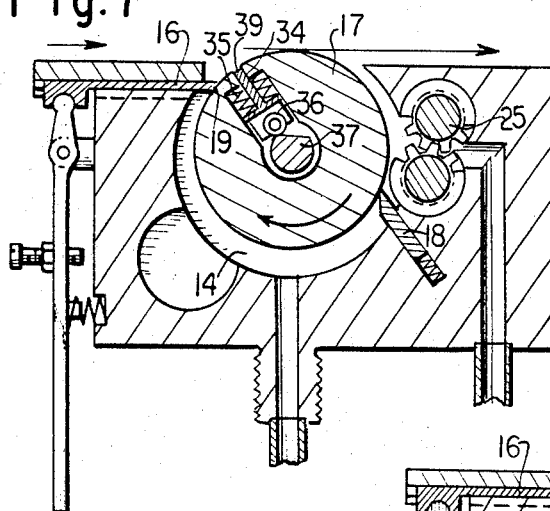
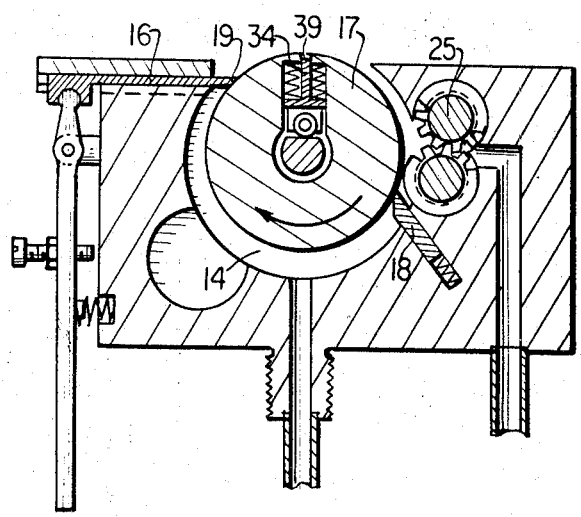
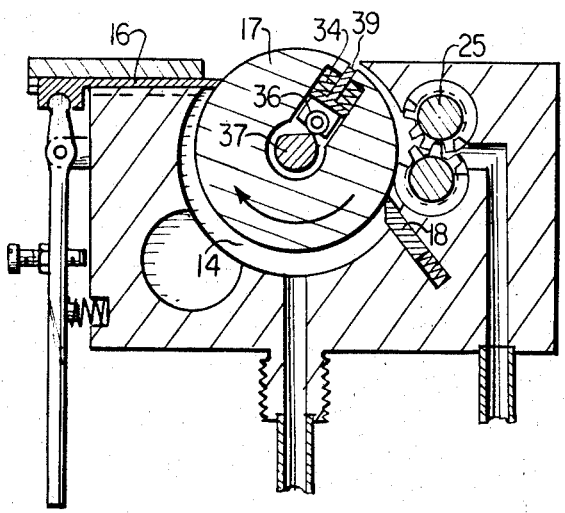
INVENTOR
EWALD SCHNEIDEREIT
BY
*Hammond & Littell*
ATTORNEYS United States Patent Office 3,410,713
Patented Nov. 12, 1968

3,410,713
PROCESS AND APPARATUS FOR APPLICATION OF ADHESIVE
Ewald Schneidereit, Dusseldorf-Holthausen, Germany, assignor to Henkel & Cie, G.m.b.H., Dusseldorf, Germany, a corporation of Germany
Filed July 31, 1964, Ser. No. 386,493
Claims priority, application Germany, Aug. 6, 1963, H 49,915; Nov. 20, 1963, H 50,894; Dec. 6, 1963, H 51,054
10 Claims. (Cl. 117—37)

ABSTRACT OF THE DISCLOSURE

Novel process and apparatus for continuous and intermittent application of pumpable, i.e. liquid, pasty and thermoplastic, adhesives to moving paper, cardboard, textile, plastic and similar ribbons or to moving single pieces. The apparatus of the invention comprises an adhesive storage vessel, an adhesive feed line provided with a transport element, a discharge head with an intermediate chamber and an adhesive application roller, where the adhesive discharge is controlled by a slide, and further comprising an adhesive recycling line for the untransferred adhesive, which is provided with another transport element, as well as an auxiliary line which contains a control valve for controlling the pressure of the adhesive in the feed line.

PRIOR ART

It is known to apply an adhesive by means of cylindrical, smooth rollers continuously in more or less broad strips to moving paper, cardboard, textile or plastic ribbons. In the application of thermoplastic adhesives by means of cylindrical rollers it is necessary to maintain all parts of the apparatus which are in contact with the adhesive after it has melted at a temperature which excludes solidification of the adhesive. Under certain circumstances it is even necessary to heat the surface to be covered with adhesive before the adhesive is applied, in order to prevent the adhesive from setting before the parts to be adhesively connected are joined together.

It is further known to apply cold adhesive intermittently to moving ribbons made of paper, cardboard, textiles or plastics or to moving piece goods by means of segmented rollers. The segments of such rollers may be profiled in various ways, so that shaped adhesive coatings may be produced.

The use of segmented rollers for intermittent application of thermoplastic adhesives, including adhesives which melt at high temperatures, has, however, not been practical because uniform heating of the segmented roller cannot be realized and because the interstices between the segments on the roller easily clog with adhesive, whereby an exact application of adhesive with definitive outlines is no longer assured.

THE INVENTION

The process according to the present invention has as its object not only to utilize pumpable adhesives of all types, such as polyvinylacetate dispersions, but also particularly to apply thermoplastic adhesives intermittently at high frequencies to moving strips of paper, cardboard, textiles or plastics. This object is achieved by applying a thin layer of the thermoplastic adhesive onto a transfer roller from an intermediate chamber into which it has been fed from the storage vessel by means of a transport element, and by stripping the untransferred, excess adhesive which remains on the transfer roller from the latter by means of a scraper and returning it into the storage container by means of another transport element.

A particular advantage of the present invention resides in the possibility of achieving a regularly intermittent application of adhesive, where a contamination in the interval between two successive adhesive strips is avoided with certainty. This interval free from adhesive is especially important when, for example, the ribbon of paper, cardboard or plastic to be coated with adhesive is to be severed by a cut at these places.

The basic concept of the invention resides in that the molten or inherently pumpable adhesive is introduced by means of a transport device into an intermediate chamber which is located in a discharge head. The adhesive is then withdrawn from the intermediate chamber by the cylindrical transfer roller, which at the same time closes off the intermediate chamber on one side thereof, and the unconsumed, excess adhesive on the transfer roller is then first stripped from the roller with a scraper and then returned to the storage vessel by means of another transport device, preferably a gear-pump.

The "intermediate chamber" is understood to designate the space in the adhesive discharge head which is filled with adhesive under pressure from the feed pump and which is defined by the transfer roller, the control slide and the scraper. The pressure of the adhesive which is produced by the feed pump and is required in the intermediate chamber to assure the discharge of adhesive free from bubbles onto the outer surface of the transfer roller, depends upon the rheologic properties of the adhesive.

In order to achieve a satisfactory seal of the intermediate chamber by the rotatably mounted adhesive transfer roller, it is advantageous to provide the end surfaces of the roller with one or more sealing rings arranged concentrically with the axis of rotation, said sealing rings being made of plastic which has a low co-efficient of friction with respect to the material of which the adhesive discharge head is made.

The heating of the discharge head is advantageously effected by means of an electric heater which is controlled by a thermostat. The adhesive transfer roller is brought to the temperature required for transfer of melting adhesives by the heat transfer from the walls of the intermediate chamber adjacent to the roller.

The thickness and width of the layer of adhesive withdrawn by the transfer roller from the intermediate chamber is controlled by a control slide which, together with the adjacent sealing elements and the outer surface of the rotatably mounted adhesive transfer roller, forms a slit through which the adhesive is discharged due to the higher pressure existing in the intermediate chamber. The control slide may be moved back and forth at predetermined time intervals, so that an intermittent entrainment of adhesive by the outer surface of the transfer roller and thereby also a periodic interruption of the adhesive strip on a moving ribbon can be achieved.

The sealing elements provide the limitation of the adhesive strip on each side. The width of the adhesive strip is, therefore, always less than the width of the transfer roller, whereby, according to the present invention, a uniform thickness of the adhesive strip is achieved, even at the edges of the strip.

The excess adhesive which is not transferred to the surface to be coated with adhesive as the roller passes thereover, is then stripped from the transfer roller by means of a scraper and is fed into another transport device, preferably a gear pump, which returns the excess adhesive to the storage vessel.

It is advantageous if a gear of the recycling gear pump, whose axis is rotation is parallel to the axis of rotation of the transfer roller, touches the transfer roller. The circumferential velocities of the transfer roller and of the gear from the gear pump which touches the roller are advantageously the same with respect to magnitude and direction.

The heating device required for melting of thermoplastic adhesives in the storage container may, for example, consist of a perforated heating plate upon which the solid adhesive rests. However, it may also be formed by heating rods which are arranged adjacent to each other in screen-like fashion, so that the molten adhesive can drip through the interstices between the heating rods. It is further possible to provide an unperforated heating plate in the adhesive storage tank, which forms an acute angle with the horizontal and from which the adhesive can flow by the action of gravity. In order to achieve a uniform supply of adhesive in the intermediate chamber when molten adhesives are used, the heat output of the heating device is controlled in accordance with the present invention by the level of liquefield adhesive, so that a predetermined but relatively small amount of liquid hot adhesive is always present in the storage container. The remelting of this relatively small amount of adhesive after a shut-down in operation upon reactivation of the electric heater and the advance of the liquefied adhesive into the intermediate chamber takes place so rapidly that practically no loss of time occurs and decomposition of the adhesive by local overheating is avoided. In accordance with a further characteristic of the invention, a safety valve is provided in parallel with the feed and recycling line of the adhesive; this safety valve operates as a pressure surveillance device, is adjustable and preferably spring-loaded. The required adhesive pressure in the intermediate chamber, which depends upon the viscosity of the particular adhesive, may thereby be regulated. Upon interruption of the adhesive application, this safety valve causes a bypass flow in the feed and recycling line due to a pressure increase in the intermediate chamber caused by an excess over the predetermined amount of adhesive therein. This bypass flow has the consequence of a constant admixing of the liquid adhesive in the storage container. The pressure in the intermediate chamber may also be maintained constant by means of a switch which is actuated by a membrane that forms a part of the wall of the intermediate chamber.

Of course, it is also possible to combine other known melting devices with the adhesive transfer head according to the present invention.

Moreover, the adhesive strip to be applied continuously or intermittently may be made as wide as desired by means of the process according to the present invention. This is possible by a simple exchange of the control slide and the sealing elements adjacent thereto. Thus, the present process makes it possible to produce adhesive strips of practically any desired width, because the static pressure of adhesive required for the flow of pumpable adhesive through the slit, which is formed by the control slide and the adjacent sealing elements and further by the outer surface of the transfer roller, is uniformly great over the entire width of the slit. In the case of intermittent adhesive application, sharply defined shaped adhesive areas thereby result on the transfer roller and thus also on the surface to be coated with adhesive.

Another advantage of the present invention resides in that it enables the discharge head with the adhesive transfer roller to be brought into any desired position. Therefore, surfaces may be coated with adhesive which form any desired angle with the horizontal without the occurrence of an undesirable adhesive discharge and a contamination of the apparatus or the object to be coated with adhesive connected with such discharge. Furthermore, several discharge heads may be supplied from a common adhesive storage container, because the special arrangement of discharge head and adhesive storage container may be selected as desired.

Finally, it is, of course, possible to use also pumpable cold adhesives of all kinds in the apparatus according to the present invention. In that case, the heating devices in the storage container and discharge head merely remain unactuated or are completely omitted.

In order to achieve an intermittent application of adhesive at still higher frequencies and still greater velocities of the surfaces to be coated with adhesive, the adhesive transfer roller may, in accordance with the present invention, be further modified so that advancing rates of up to 200 meters per minute of the surface to be coated with adhesive can be easily reached, where a periodic interruption of adhesive application down to an internal distance of only 2 mm. is possible. The achievable frequency depends merely upon the diameter of the transfer roller. For instance, 700 interruptions per minute in the adhesive strip may be achieved.

This technical problem is solved by forming a portion of the circumference of the transfer roller with the end surface of a correspondingly shaped and movably mounted interrupter which is controlled in such a way that during each revolution of the roller an accurately defined section of the ribbon of material to be coated with adhesive is not coated with adhesive. Of course, it is also possible to provide a plurality of interrupters on the circumference of the adhesive transfer roller. Two or more sharply defined intervals in the adhesive coating per revolution of the roller can be achieved thereby.

An interruptor, within the meaning of the present invention, is a part mounted within the adhesive transfer roller and slidable between two extreme portions, said part being characterized in that its end surface forms that portion of the roller circumference which should not transfer any adhesive onto the moving ribbon of material.

In accordance with the present invention, the procedure to effect an intermittent application of adhesive is first to adjust the required thickness of the layer of adhesive on the transfer roller. After the passage of the control edge of the control slide, a suitable actuating device initiates the movement of the interruptor toward the interior of the transfer roller until the interruption position is reached. The circumferential surface of the transfer roller is thereby interrupted over a certain length and over the width of the adhesive strip, and the transfer of adhesive from this location is no longer possible because the adhesive, which is located on the front edge of the interruptor, together with the interruptor itself, is withdrawn toward the interior of the transfer roller, and the adhesive coating is at this location not in contact with the ribbon of material to be coated with adhesive.

The closed position is understood to mean the extreme position of the interruptor which exists when its front surface is within the plane of circumferential surface of the transfer roller.

The interruption position is the control-actuated extreme position of the interruptor when its front surface with the adhesive coating thereon is pushed into the interior of the adhesive transfer roller.

Before the place along the circumference of the adhesive transfer roller occupied by the front surface of the interruptor comes within range of the recycling gear pump, the interruptor control causes the interruptor to return to the closed position, so that its front surface again closes the circumferential surface of the transfer roller and the scraper assures a secure seal of the intermediate chamber.

Of course, the intermittently applied adhesive strip may be made to have practically any desired width by selecting a corresponding width of the adhesive transfer roller.

In FIGS. 4 to 10 an illustrative embodiment of the adhesive transfer roller according to the present invention is shown, where the interruptor-control is actuated in known fashion by means of a cam.

A further feature of the present invention has the purpose of drawing the so-called spinning threads, which form when solvent-containing adhesives or also other thread-forming adhesives are used, into the adhesive discharge head as they are formed and thereby to prevent a contamination of the machine. In accordance with the present invention, this technical problem is solved by providing an additional gear wheel which protrudes from the discharge head, revolves in a direction opposite to that of the transfer roller, grasps the spinning threads which are formed and pulls them into the discharge head.

An illustrated embodiment of the present invention is shown in FIGS. 1 to 11 of the drawings, of which:

FIG. 1 is a section through the adhesive applying machine;

FIG. 2 is a top view of the discharge head with transfer roller;

FIG. 4 is a cross-section through the adhesive transfer roller;

FIG. 5 is a longitudinal section through the adhesive transfer roller;

FIG. 6 is a front elevation of the adhesive transfer roller;

Figure 3:
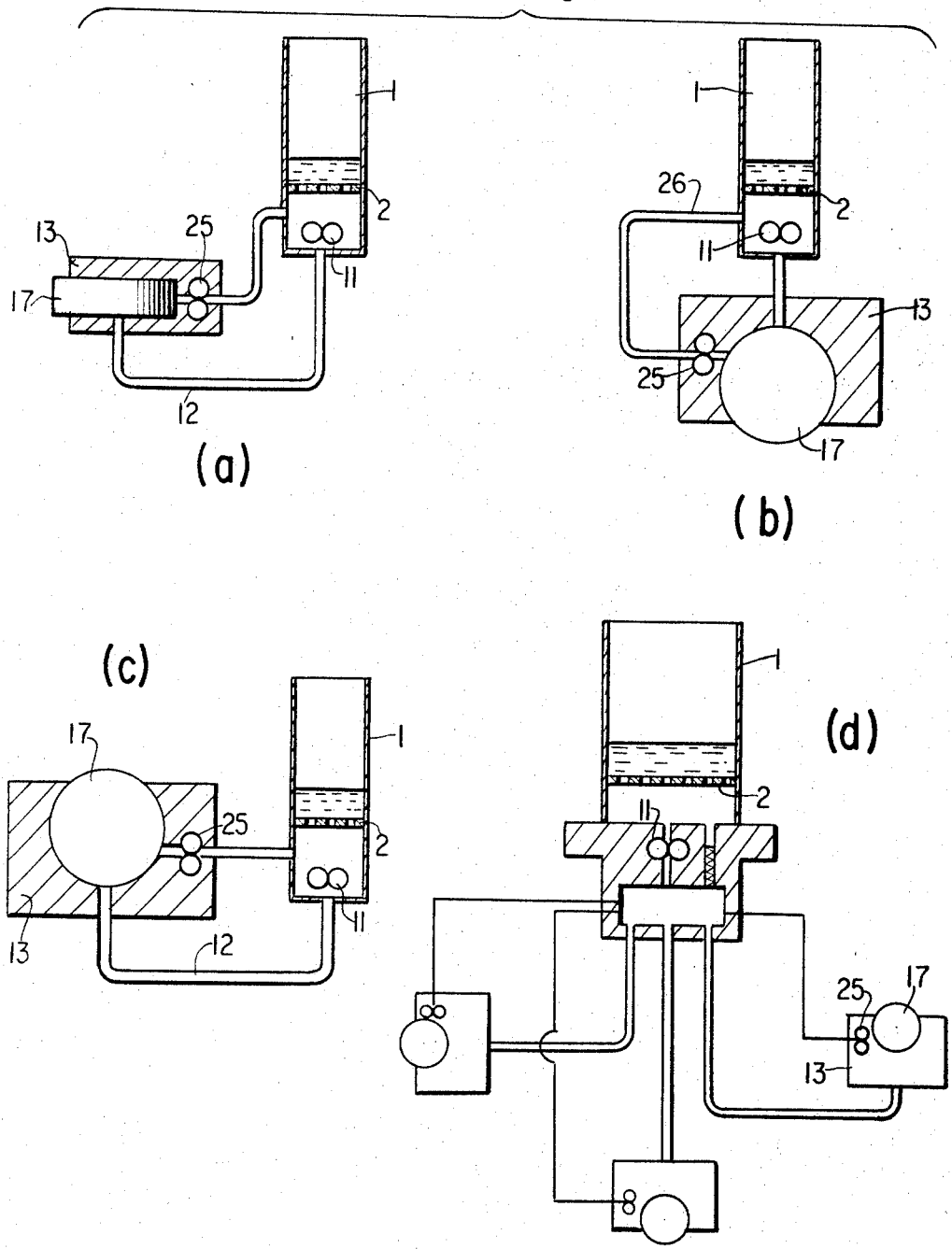
FIG. 3 shows installation arrangements for (a) applying adhesive to vertical surfaces, (b) applying adhesive to horizontal surfaces from above, (c) applying adhesive to horizontal surfaces from below, and (d) simultaneous application of adhesive to a plurality of surfaces with several discharge heads which are supplied from a common storage container.

FIGS. 7 to 9 are sections through the discharge head and the transfer roller comprising an interruptor according to the present invention, of which FIG. 7 shows the position of the transfer roller before interruption of the adhesive transfer, FIG. 8 shows the position of the transfer roller at the moment of interruption of the adhesive transfer, and FIG. 9 shows the position of the transfer roller after interruption of the adhesive transfer;

FIG. 10 is an example of a periodically interrupted strip of adhesive; and

FIG. 11 is a section through a discharge head with protruding gear, which grasps the spinning threads as they are formed and draws them into the discharge head.

Referring now to FIG. 1, in a storage and melting vessel 1 on a perforated heating plate 2 there is a supply of thermoplastic adhesive which may be introduced in any desired form. The adhesive melted by the heating plate 2 passes through openings 4 into space 5 which is maintained at a constant melting point temperature by means of electric heater 6 with thermostat 7. In order to avoid an undesirable flow of heat from heater 6 or heating plate 2 to the walls of storage container 1, heat insulation layers 8 and 9 are provided. A level control device 10, which may work on thermoelectric or mechanical principles, controls the heat output of heating plate 2, so that only a relatively small amount of molten adhesive is present at any time in space 5. Gear pump 11 advances the liquid adhesive through line 12 into intermediate chamber 14 located within discharge head 13. Intermediate chamber 14 comprises a membrane 15 which actuates an electric switch (not shown) which starts the driving motor of gear pump 11 when the pressure of the adhesive in intermediate chamber 14 is too low and shuts it off when the adhesive pressure is too high. The intermediate chamber 14 is defined by control slide 16, sealing elements 29 adjacent thereto as shown in FIG. 2, rotatably mounted and liquid-tight fitted transfer roller 17 and scraper 18.

In its closed position, the control edge 19 of control slide 16 lies tight against the circumference of transfer roller 17. The control slide 16 is operated by a lever 21 pivoted at point 20. The control slide 16 is constantly pressed into its closed position by lever 21 under the influence of pressure spring 22. The opening of a slit to allow discharge of adhesive from the intermediate chamber 14 is effected by a single or regular periodic actuation of lever 21, for instance, by means of an electromagnet 23. The stroke of lever 21 and thus the distance of control edge 19 from the outer surface of transfer roller 17 is determined by set screw 24, whereby the thickness of the strip of transferred adhesive is determined.

Excess adhesive, which has not been transferred from roller 17 to the place of consumption, is stripped from transfer roller 17 by scraper 18 and thereby reaches the aspiration range of recycling gear pump 25, which returns the unconsumed adhesive through line 26 into space 5.

In order to achieve a mixing effect in the molten adhesive in space 5, a bypass line 28 is provided, which comprises a spring-loaded safety valve 27. By adjustment of the safety valve 27 the pressure of adhesive in intermediate chamber 14 is determined. During consumption of adhesive at the transfer roller 17 only a portion of the adhesive advanced by gear pump 11 flows through bypass line 28, whereas during interruptions of adhesive transfer the entire amount of adhesive advanced by gear pump 11 is returned to space 5 through the bypass.

The width of transferred adhesive is determined by the width of the control slide 16 which is laterally abutted by resiliently mounted sealing elements 29, as shown in FIG. 2. By exchanging the control slide 16 and the sealing elements 29 it is possible to achieve practically any desired width of the adhesive strip 30.

The meshed gear assembly 31, 32 drives the adhesive transfer roller 17 as well as the recycling gear pump 25 in such a way that the circumferential velocities of the transfer roller 17 and the gear of gear pump 25 which touches it are equal with respect to magnitude and direction at the point of contact. The meshed gear assembly 31, 32 may, for example, be driven by a chain at sprocket wheel 33.

Referring now to FIGS. 4 to 6, an interruptor 34 is mounted within adhesive transfer roller 17 so as to be slidable toward the axis of rotation of the roller. A roller 36, which is rigidly connected with interruptor 34 but is itself rotatably mounted, abuts under the force of springs 35 against the cam of cam shaft 37. Cam shaft 37 does not rotate or move relative to the discharge head. The interruptor 34 comprises a front surface 39 which is shaped to fit the circumferential surface of transfer roller 17. The adhesive transfer roller 17 is driven by hollow drive shaft 38.

After control edge 19 of control slide 16 passes by the interruptor, as shown in FIG. 7, the rotatable roller 36 moves into the range of the flat portion of the cam of cam shaft 37. The pressure springs 35 can now displace the interruptor 34 in the direction of the axis of rotation of adhesive transfer roller 17.

FIG. 8 shows the instance when an interruption of the adhesive transfer takes place by virtue of the fact that the front surface 39 of the interruptor 34 is withdrawn into the interior of the transfer roller 17 and the layer of adhesive at that place of the roller is thereby not in contact with the ribbon of material to which the adhesive is to be applied.

FIG. 9 shows the passage of roller 36 from the flat portion of cam shaft 37 to its cylindrical portion, whereby the front surface 39 of interruptor 34 again closes the gap in the circumferential surface of transfer roller 17.

FIG. 10 shows by way of example, the application of adhesive in the form of a strip 7 mm. in width, which is interrupted every 160 mm. by a 2 mm. gap in longitudinal direction. Any desired dimensions can, of course, be provided for within the scope of the invention, by suitable design of the roller and interruptor.

In order to avoid contamination of the machine by spinning threads, the adhesive discharge head 13 may be provided with an additional gear wheel 25a, as shown in FIG. 11, which meshes with the recycling gear pump 25. This gear wheel 25a, which protrudes from discharge head 13, rotates in a direction opposite to that of adhesive transfer roller 17. Gear wheel 25a is preferably mounted in such a way that it touches the adhesive transfer roller 17. It should advantageously be mounted in such a way that the surface to be coated 40 is not obstructed in its direction to travel by the protruding portion.

The so-called spinning threads, which form after the adhesive application proper between the adhesive-coated surface 40 and the transfer roller 17, are grasped by the additional gear wheel 25a, which protrudes from the discharge head 13 and rotates in a direction opposite to that of the transfer roller 17, and are drawn into the adhesive discharge head 13.

In this connection it is of substantial importance that the spinning threads have no opportunity to settle on other parts of the machine. During their formation they wrap around the gear wheel 25a which protrudes from the adhesive discharge head 13. By virtue of the motion of the adhesive-coated surface 40 and because of the opposite direction of motion of the spinning threads and the circumference of the protruding gear wheel 25a at their point of contact, the spinning threads are drawn into the adhesive discharge head 13. The recycling gear pump 25 then moves this adhesive mass out of the adhesive discharge head. The spinning threads 41 can, therefore, no longer deposit themselves on other parts of the machine and contaminate the same.

It will be understood that certain specific embodiments and preferred modes of practice of the invention have been described for the sake of illustration and to enable persons skilled in the art to understand the invention. However, the invention is not intended to be limited thereto and various changes and modifications may be made without departing from the spirit of the disclosure or the scope of the appended claims.

I claim:

1. Process for applying a heated adhesive intermittently to a moving surface which comprises the steps of continuousuly providing a hot fluent adhesive from a heated storage vessel to an intermediate chamber, said chamber having a rotating interrupter roller being adapted to have its surface pass into and out of said intermediate chamber in sealed relationship, passing said roller in contact with adhesive in said chamber to provide a layer of a fluent adhesive on said roller surface, varying the exit opening from said chamber to vary the dimensions of said adhesive layer, bringing said adhesive layer into contact with said moving surface to transfer a substantial portion of said adhesive to said moving surface, interrupting the roller surface after application of said adhesive layer and before contact with said moving surface, re-establishing said roller surface, and thereafter removing the excess remainder of said adhesive from said roller surface prior to entry of the surface into said intermediate chamber, and transferring said excess to said storage vessel.

2. An apparatus for intermittent application of pumpable adhesives to moving surfaces, said apparatus comprising a heated adhesive storage container, a melting chamber having a bottom wall in communication with said storage container, control means responsive to the level of adhesive in said storage container to regulate the heat output of the melting chamber so as to maintain a predetermined amount of adhesive in the storage container, means for advancing the adhesive to the place of consumption, an intermediate chamber and an adhesive transfer roller which is fitted in pressure-tight fashion in said intermediate chamber and which comprises at each end surface at least one sealing ring which is concentric with the axis of rotation of the roller and which is made of a plastic material having a low coefficient of friction with respect to the material of which the intermediate chamber is made, a movable means whose edge together with adjacent sealing means and the outer surface of the transfer roller forms the discharge opening of said intermediate chamber, means in contact with said outer roller surface where it re-enters said chamber to remove excess adhesive, and transport means for returning the excess adhesive to said storage container.

3. Apparatus according to claim 2, comprising adjustable and automatic by-pass means from said advancing means back to said adhesive storage container.

4. Apparatus according to claim 2, wherein said means for returning excess adhesive to storage comprises a gear pump and said transfer roller and said gear pump are driven by means which causes the outer surfaces of the transfer roller and the gear wheel of the gear pump in contact with the roller to have the same circumferential velocities with respect to magnitude and direction of the point of contact.

5. Apparatus according to claim 2, wherein the movable means comprises a slide and a lever for changing the position of the slide with an adjustable stroke-limiting means.

6. Apparatus for application of adhesives to moving surfaces according to claim 2, wherein said adhesive transfer roller comprises at least one slidable interruptor whose front surface forms a part of the outer surface of the roller and which is slidable into the interruption position by means of a control.

7. Apparatus according to claim 6, characterized in that the slide path of said interruptor coincides with a radius of said adhesive transfer roller.

8. Apparatus according to claim 6, wherein said control is effected by cam means.

9. Apparatus for applying adhesive to moving surfaces according to claim 4, wherein there is provided an additional gear wheel which meshes with said gear pump so as to remove adhesive spinning threads formed between said transfer roller and the moving surface.

10. Apparatus for applying adhesive to moving surfaces according to claim 9, wherein said additional gear wheel protrudes from the discharge side of said intermediate chamber.

References Cited

UNITED STATES PATENTS

| | | | |
|---|---|---|---|
| 2,231,574 | 2/1941 | Emerick | 118—212 |
| 2,554,035 | 5/1951 | Kreyling | 118—203 X |
| 2,787,241 | 4/1957 | Kelley | 118—202 X |
| 2,824,541 | 2/1958 | Paulsen | 118—202 X |
| 2,900,951 | 8/1959 | Kabelitz | 118 258 X |
| 3,046,935 | 7/1962 | Wilson | 118—261 X |
| 3,107,181 | 10/1963 | Bauder | 118—211 |
| 3,255,727 | 6/1966 | Boothroyd | 118—202 X |
| 3,294,060 | 12/1966 | McIntyre et al. | 118—261 |

ALFRED L. LEAVITT, Primary Examiner.

C. R. WILSON, Assistant Examiner.